US012320359B2

(12) United States Patent
Dane

(10) Patent No.: US 12,320,359 B2
(45) Date of Patent: Jun. 3, 2025

(54) SUBMERSIBLE PUMP APPARATUS

(71) Applicant: Willis Dane, Peru, IL (US)

(72) Inventor: Willis Dane, Peru, IL (US)

(73) Assignee: AQUA CONTROL, INC., Spring Valley, IL (US)

( * ) Notice: Subject to any disclaimer, the term of this patent is extended or adjusted under 35 U.S.C. 154(b) by 0 days.

(21) Appl. No.: 17/703,348

(22) Filed: Mar. 24, 2022

(65) Prior Publication Data

US 2022/0316498 A1 Oct. 6, 2022

Related U.S. Application Data

(60) Provisional application No. 63/168,570, filed on Mar. 31, 2021.

(51) Int. Cl.

| | |
|---|---|
| ***F04D 13/12*** | (2006.01) |
| ***B05B 17/08*** | (2006.01) |
| ***F04D 13/08*** | (2006.01) |
| ***F04D 29/40*** | (2006.01) |
| ***F04D 29/42*** | (2006.01) |
| ***F04D 29/62*** | (2006.01) |

(52) U.S. Cl.

CPC .............. *F04D 13/12* (2013.01); *B05B 17/08* (2013.01); *F04D 13/086* (2013.01); *F04D 29/406* (2013.01); *F04D 29/426* (2013.01); *F04D 29/628* (2013.01)

(58) Field of Classification Search

CPC ........ F04D 13/086; F04D 13/12; F04D 13/14; F04D 23/14; F04D 29/406; F04D 29/426; F04D 29/628; B05B 9/0406; B05B 9/0416; B05B 17/08; B05B 1/36; F04B 23/02; F04B 23/021; F04B 23/08; F04B 23/10; F04B 23/12; F04B 23/14

USPC ............... 239/17, 23, 211, 22, 551; 138/106

See application file for complete search history.

(56) References Cited

U.S. PATENT DOCUMENTS 312,958 A * 2/1885 Bolton .................... B05B 17/08 239/20
1,903,974 A * 4/1933 Brink ...................... B05B 17/08 239/18
3,773,258 A * 11/1973 Hruby, Jr. ............... B05B 17/08 239/406

(Continued)

FOREIGN PATENT DOCUMENTS

CN 205859360 U * 1/2017 ................ F16L 3/10
DE 1116608 B * 11/1961 ................ F21S 8/00

(Continued)

*Primary Examiner* — Essama Omgba
*Assistant Examiner* — Chirag Jariwala
(74) *Attorney, Agent, or Firm* — KNECHTEL, DEMEUR & SAMLAN

(57) ABSTRACT

A submersible pump providing an impeller pump assembly, an aerator pump assembly, a central hub assembly, and a nozzle assembly. The combination or integration of two independently driven, high-pressure impeller pump assembly and high-volume pump aerator pump assembly simultaneously coacting within the same submersible pump apparatus and using the central hub assembly and nozzle assembly to create and display the combination of very tall streams while simultaneously displaying a wide variety of other beautiful high-volume or flow display aerator spray patterns

13 Claims, 8 Drawing Sheets

(56) References Cited

U.S. PATENT DOCUMENTS

| | | | | | |
|---|---|---|---|---|---|
| 5,718,379 | A * | 2/1998 | Cramer | B05B 17/08 239/17 |
| 2003/0134564 | A1* | 7/2003 | Yen | F21S 8/00 446/158 |
| 2005/0129546 | A1* | 6/2005 | Lin | F21V 33/00 417/313 |
| 2009/0032611 | A1* | 2/2009 | Fulton | B05B 17/085 239/211 |
| 2017/0107985 | A1* | 4/2017 | Fess, II | F04D 3/005 |
| 2019/0060944 | A1* | 2/2019 | Fuller | F21S 8/032 |

FOREIGN PATENT DOCUMENTS

| | | | | | |
|---|---|---|---|---|---|
| JP | H10113590 | A | * | 5/1998 | B05B 17/08 |
| JP | 2003172465 | A | * | 6/2003 | F16K 11/044 |

* cited by examiner

SUBMERSIBLE PUMP APPARATUS

I. CROSS-REFERENCE TO RELATED APPLICATION

This patent application is a non-provisional application claiming priority from U.S. Provisional Patent Application Ser. No. 63/168,570, entitled "New and Improved Submersible Pump Apparatus", filed on Mar. 31, 2021, and is fully incorporated herein by reference.

II. FIELD OF THE INVENTION

The present invention relates to submersible pumps and, more particularly, to a new and improved submersible pump apparatus that utilizes independently driven, high-pressure and high-volume pumps that work simultaneously within the same submersible pump apparatus to create a unique display of very tall streams in combination with a wide variety of beautiful high flow display spray patterns.

III. DESCRIPTION OF THE PRIOR ART

Submersible pumps have been around in the public domain for many years. A typical submersible pump is a device that has a hermetically sealed motor coupled with a pump and a discharge assembly. The entire submersible pump is submerged in a fluid such as water, oil, or other fluid depending upon the application and use, and then used to pump this fluid to the surface. While submersible pumps are used in t any applications such as circulation or aeration devices commonly used for creating directional flow in a pond or lake to turn still, stagnant water into a stream environment, they are also used to create a fountain or other visual water displays and designs.

The problem faced by every fountain designer is that a high-volume pump cannot create much height and a high-pressure or high-head pump cannot create much volume. As a result, every attempt to create both height and volume from one submersible pump apparatus has failed or requires that very thin, inefficient streams be used throughout (as thin streams plug easily, blow apart in a breeze causing the display design to contort or disappear, and likewise never maintain a coherent stream for much distance).

Applicant, however, has invented a new, extremely unique, product that solves this problem through the combination or integration of two independently driven, high-pressure and high-volume pumps that work simultaneously within the same submersible pump apparatus. In this manner, the submersible pump apparatus creates a unique combination display that utilizes one pump, the high-pressure pump, optimized to efficiently create and display very tall streams while, simultaneously or at the same time, utilizes the other pump, the high-volume pump, optimized to efficiently create and display a wide variety of other beautiful high-volume or flow display aerator spray patterns.

Additionally, another huge benefit of Applicant's new invention is that this product can be used in almost any body of water as it is designed to operate in very shallow water (e.g., as little as 2 feet or 24 inches of water).

Accordingly, Applicant's new and improved inventive submersible pump apparatus solves these and other problems. Thus, there is a need and there has never been disclosed Applicant's unique submersible pump apparatus.

IV. SUMMARY OF THE INVENTION

The present invention is a submersible pump providing an impeller pump assembly, an aerator pump assembly, a central hub assembly, and a nozzle assembly. The combination or integration of two independently driven, high-pressure impeller pump assembly and high-volume pump aerator pump assembly simultaneously coacting within the same submersible pump apparatus and using the central hub assembly and nozzle assembly to create and display the combination of very tall streams while simultaneously displaying a wide variety of other beautiful high-volume or flow display aerator spray patterns.

BRIEF DESCRIPTION OF THE DRAWINGS

The Description of the Preferred Embodiment will be better understood with reference to the following figures.

VI. DETAILED DESCRIPTION OF THE PREFERRED EMBODIMENT

Figure 1:
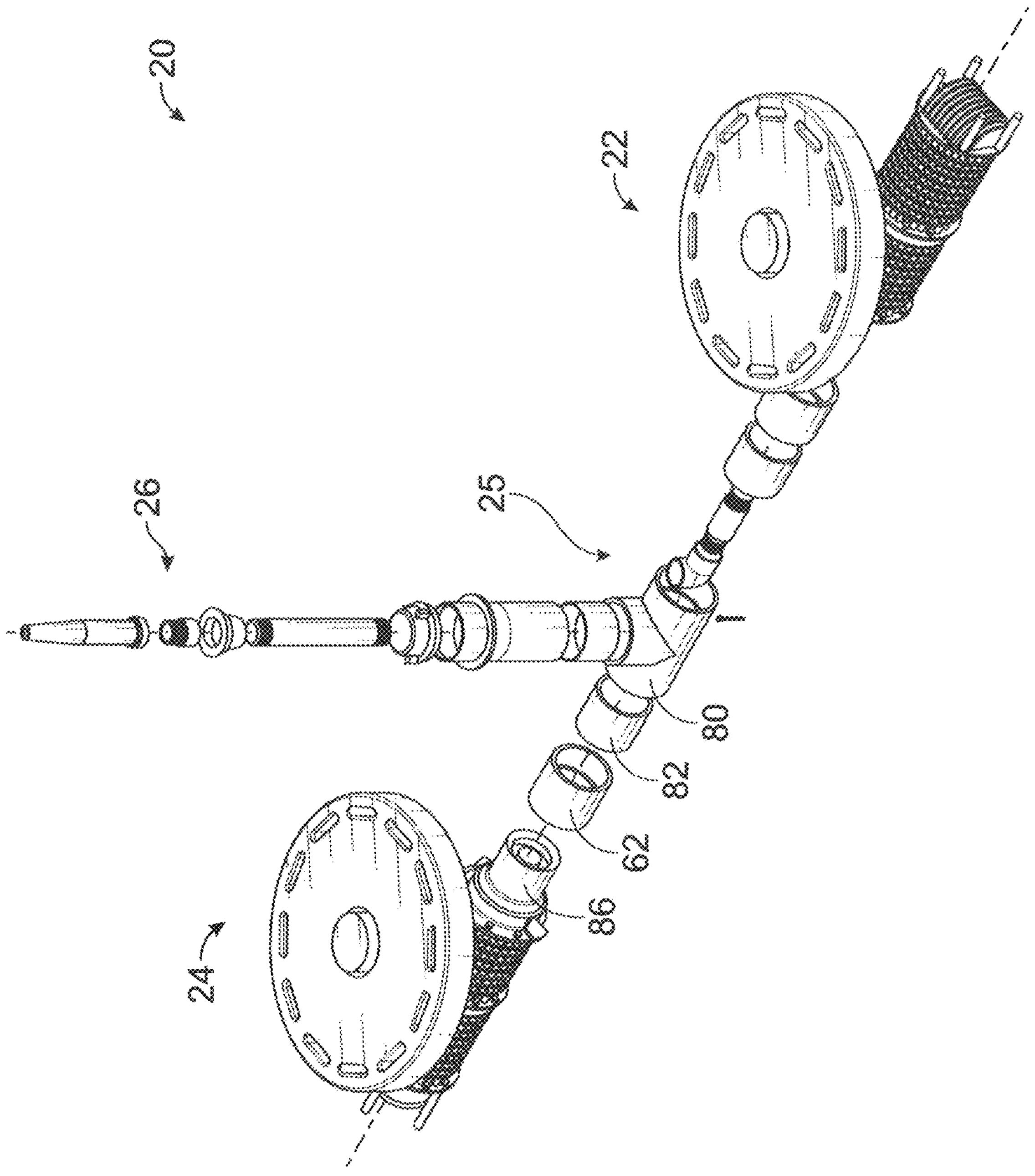
FIG. 1 is a perspective view of Applicant's submersible pump apparatus.

Turning first to FIG. 1, there is illustrated a submersible pump apparatus 20. The submersible pump 20 comprises an impeller pump assembly 22, an aerator pump assembly 24, a central hub assembly 25, and a nozzle assembly 26.

Figure 2:
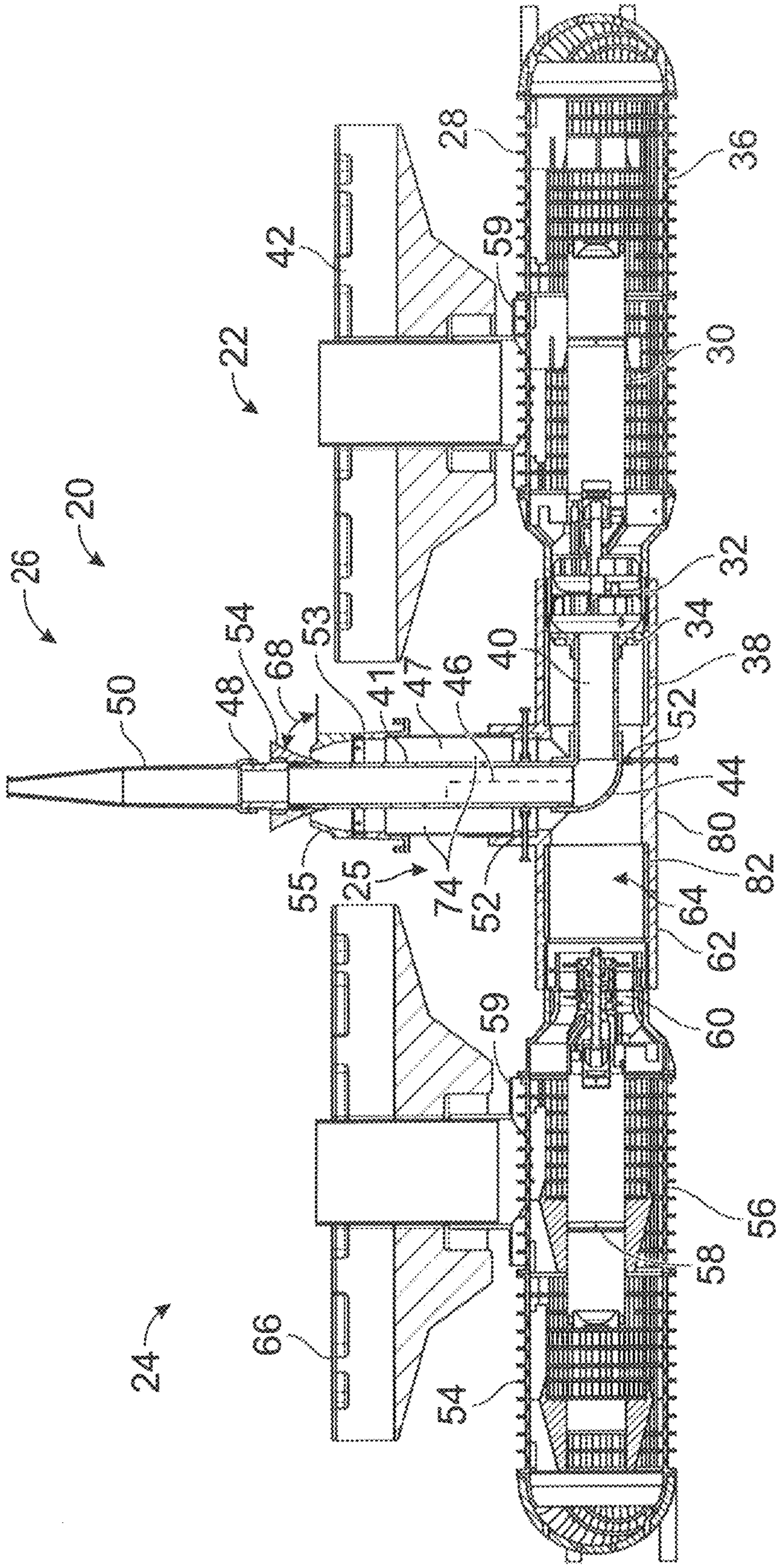
FIG. 2 is a side cross-sectional view of the submersible pump apparatus illustrating, in particular, the impeller pump assembly, the aerator pump assembly, the central hub assembly, and the nozzle assembly.
Figure 3:
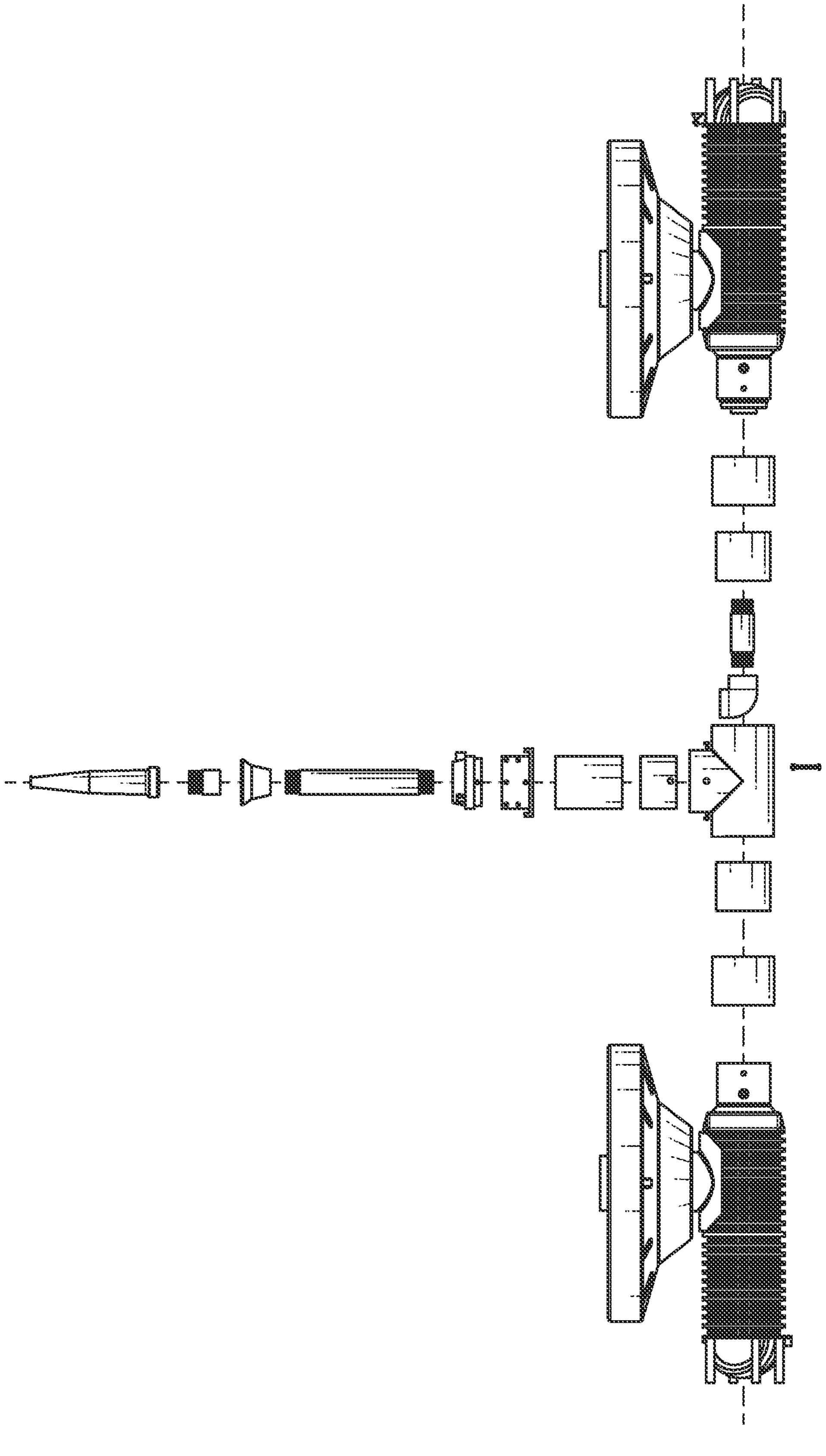
FIG. 3 is an exploded perspective view of the submersible pump apparatus illustrating, in particular, various components of the impeller pump assembly, the aerator pump assembly, the central hub assembly, and the nozzle assembly.

The impeller pump assembly 22 (also, referred to herein as "high-pressure pump"), in its assembled form and as illustrated in FIG. 2, comprises a suction screen 28 about a housing 36 containing an impeller motor 30, an impeller pump 32, and a combo outlet flange 34. In this design, the housing 36 of the high-pressure pump 22 is removeably attached to a leg 38 of the central hub assembly 25. The combo outlet flange 34 interconnects the impeller motor 30 and impeller pump 32 to the pipe 40 situated within the leg 38. In the preferred embodiment, the interconnection of the combo outlet flange 34 to the pipe 40 is a "slip fit" leak free fitting.

Additionally, a float 42 is also attached to the exterior of the impeller motor 30 using a saddle tee 59. The float 42 is used to float the submersible pump apparatus 20 at the surface of the water such that the submersible pump apparatus 20 may be used, for example, as a floating fountain. In this manner, with this float 42 and the float 66, discussed below, the submersible pump apparatus 20 can be used in almost any body of water as it is designed to operate in very shallow water (e.g., as little as 2 feet or 24 inches of water).

The output of the high-pressure pump 22 is discharged into the pipe 40 that slips closely into the combo outlet flange 34. The other end of the pipe 40 is threaded into a 90 degree elbow 44 that is positioned inside the central hub assembly 25 so that the 90 degree end of the elbow 44 is centered within the branch of that central hub assembly 25 so that the high-pressure vertical pipe nipple or central high-pressure pipe 41 can be threaded into the central hub assembly 25 and will be approximately centered. The pipe length of the high-pressure pipe 41 is such that it protrudes through the nozzle base 51 (FIG. 4) the desired amount so that the nozzle adapter 48, if required, or the center nozzle 50 can be threaded onto the central high-pressure pipe 41. Thus, the high-pressure pump output is directed to a center nozzle 50.

Since the high-pressure water flows through from the high-pressure pump 22, into the pipe 40 which then engages the elbow 44 creating turbulence in the water flow, the lower section of the central high-pressure pipe 41 is fitted with a flow straightening device 46 to remove this turbulence from the water flow so that the discharge from the center nozzle 50 can generate a smooth and coherent stream.

The pressure in the high-pressure pipe 41 will tend to push the central hub assembly 25 away from the high-pressure pump 22 and de-center it. This will tend to push the elbow 44 and pipe 41 down so a series of supports 52 are secured to the elbow 44 and pipe 41 to assure that the central hub assembly 25 output stays centered during operation of the high-pressure pump 22.

The aerator pump assembly 24 (also, referred to herein as "high-volume pump"), in its assembled form and as illustrated in FIG. 2, comprises a suction screen 54 about a housing 56 containing an acrator motor 58, and an aerator pump 60. In this design, the housing 56 of the high-volume pump 24 is removeably attached to a leg 62 of the central hub assembly 25. More specifically, as illustrated in FIG. 1, is a tee 80, a pipe 82, and a pump housing 86. As illustrated in FIG. 2, one end of the pipe 82 is secured to the tee 80. The pipe 82 is then secured inside the leg 62. The pump housing 86 of the aerator pump 60 is then inserted inside and secured to the leg 62. In this manner, this interconnects the aerator motor 58 and the aerator pump 60 to the opening 64 within the central hub assembly 25. In the preferred embodiment, the opening 64 comprises all of the open space within the central hub assembly 25 surrounding the pipe 40, elbow 44, and high-pressure pipe 41. Additionally, a float 66 is also attached to the exterior of the aerator motor 58 using the saddle tee 59.

As described above, the central hub assembly 25 comprises the leg 38, leg 62, the pipe 40, elbow 44, and pipe 41, flow straightener 46, and leg 47.

Figure 4:
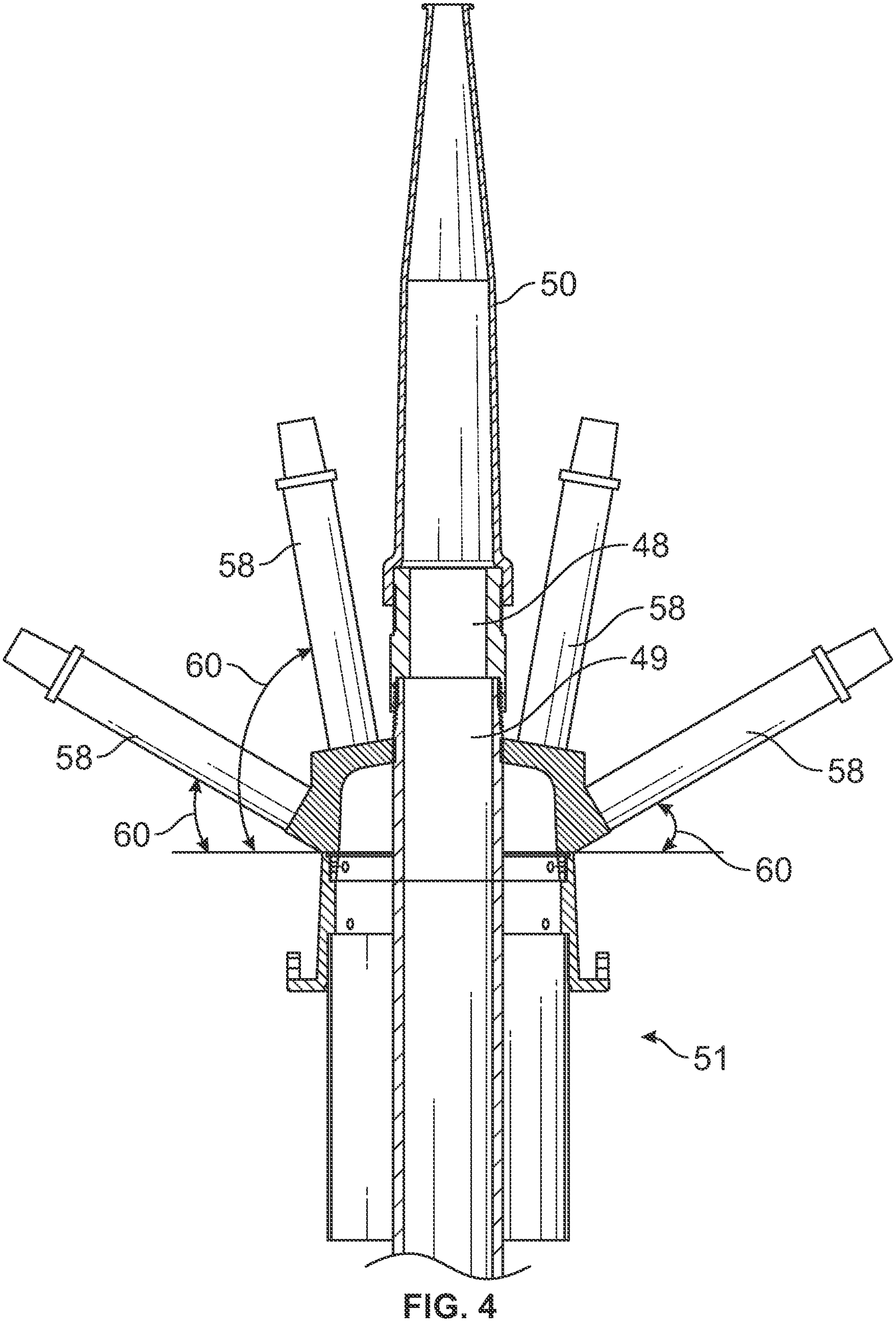
FIG. 4 is a side cross-sectional view of an alternate embodiment of the nozzle assembly and, in particular, illustrating a multiple nozzle system.

The nozzle assembly 26 comprises a central nozzle 50, a large pipe 49, an adapter 48, an interchangeable nozzle head 53, and a nozzle base 51 (FIG. 4).

A large pipe 49 is removeably attached to the adapter 48 and the adapter 48 to the branch of the large central hub assembly 25. The other end of the large pipe 49 has the interchangeable nozzle head 53 removeably attached. The interchangeable nozzle head 53 removeably receives the nozzle base 51 which is centrally bored to allow the smaller central pipe 41 to slip through and into the nozzle head 53. The outer portion of the nozzle base 51 is drilled and tapped to receive a multitude of nozzles 58 (see FIG. 4) used to create the high-volume or flow lower streams that create the display aerator portion of the pattern. A nozzle arrangement, as illustrated in FIG. 4, directs the high-volume or flow water to a multitude of nozzles 58 arranged in a variety of angles 60, and sometimes with some nozzles 58 restricted to control height of the stream, to create a wide variety of patterns.

Figure 5:
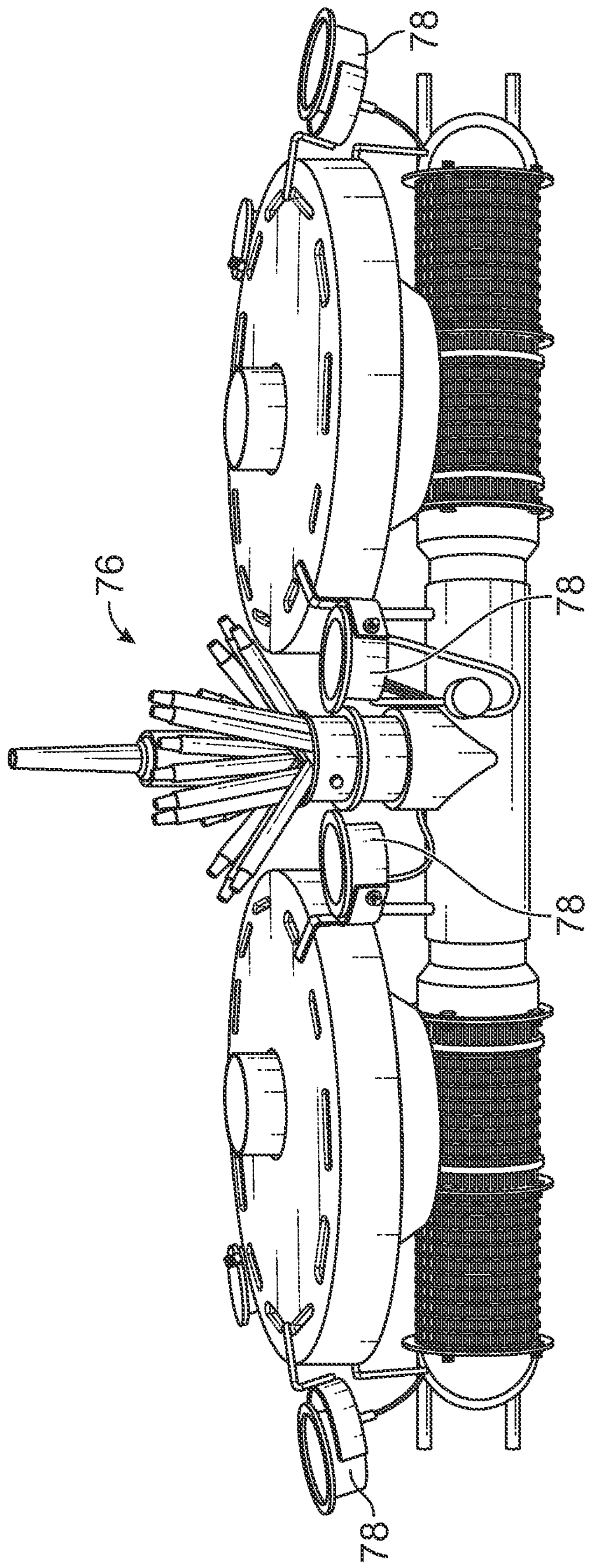
FIG. 5 is a side perspective view of the submersible pump apparatus and, in particular, illustrating the multiple nozzle system of the alternate embodiment of the nozzle assembly and lighting apparatus.

In the preferred embodiment, the multitude of nozzles 58, as illustrated in FIG. 4, can be used or provided as set forth in U.S. Continuation-In-Part patent application, Ser. No. 16/863,922, filed Apr. 30, 2020, from U.S. patent application Ser. No. 16/688,038, filed on Nov. 19, 2019, which claims the benefit of Provisional Patent Application Ser. No. 62/769,904, filed on Nov. 20, 2018, each of which is fully incorporated by reference herein in its entirety; or alternatively using the multiple nozzles 76, as illustrated in FIG. 5.

Alternatively, one or more fan patterns can easily be created. Instead of a nozzle base 51 being attached to the interchangeable nozzle head 53, a conical flare outlet or cone deflector 54, as illustrated in FIG. 2, is attached with the cone deflector 54 being slipped over the smaller high-pressure pipe 41 before the center nozzle 50 is attached. This creates an annular orifice that creates a fan of water at an angle determined by the angle 68 of the cone deflector 54.

Figure 6:
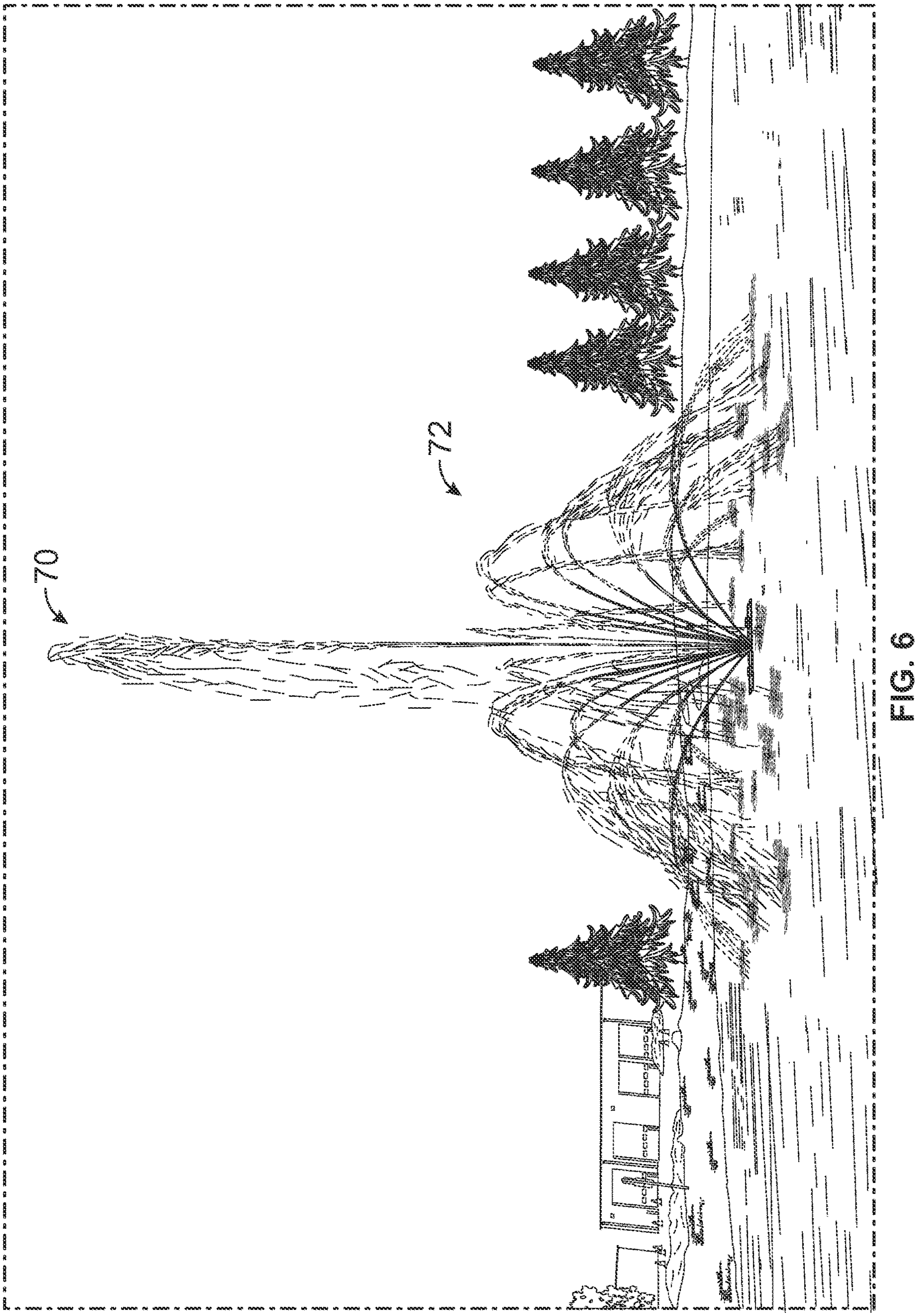
FIG. 6 is a visual water display, fountain, spray pattern, and/or design ("display") resulting from Applicant's submersible pump apparatus and, in particular, illustrating a non-limiting example of a very tall center stream in combination with a quad design.
Figure 7:
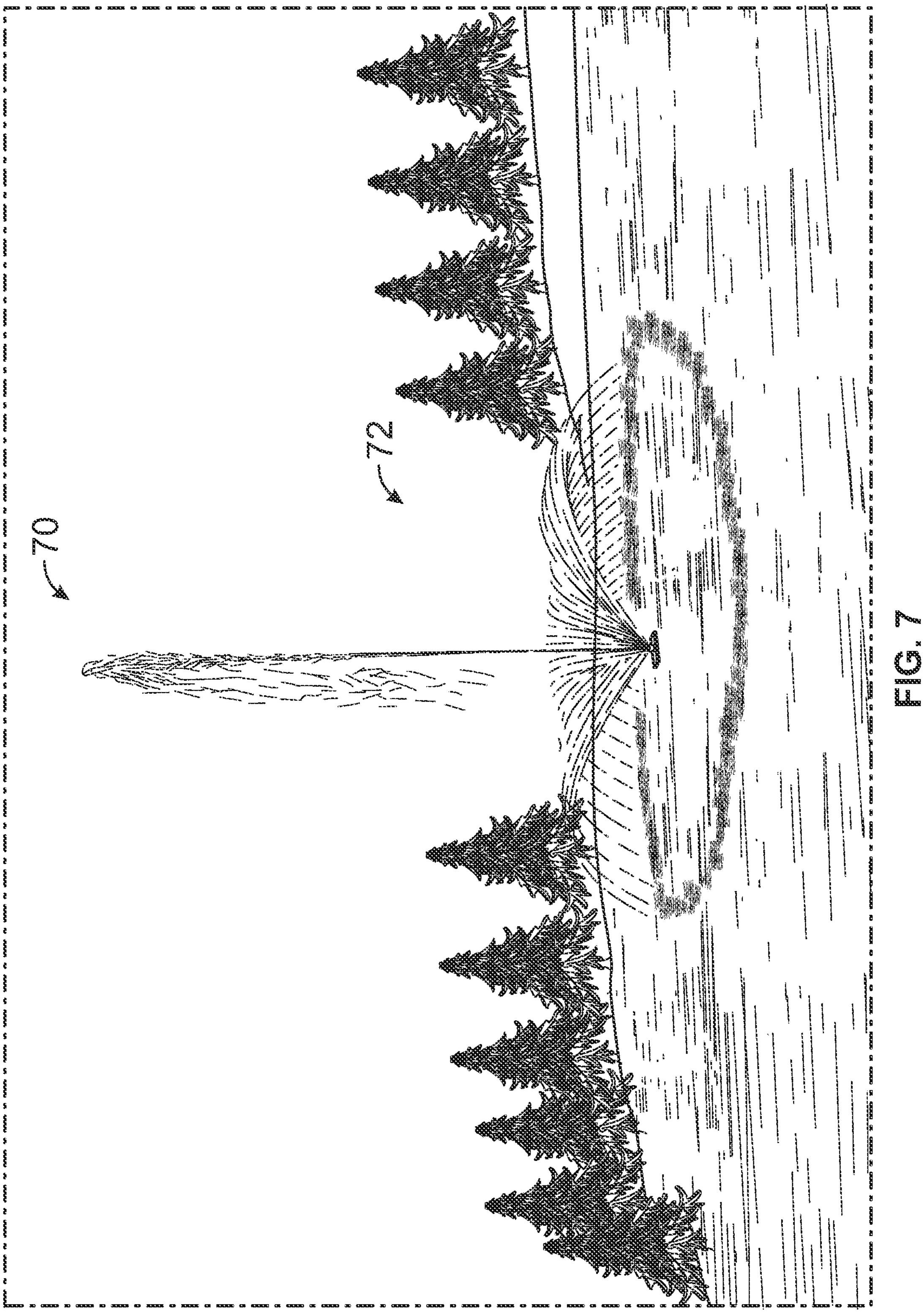
FIG. 7 is a visual water display, fountain, spray pattern, and/or design ("display") resulting from Applicant's submersible pump apparatus and, in particular, illustrating a non-limiting example of a very tall center stream in combination with a first alternate flare design.
Figure 8:
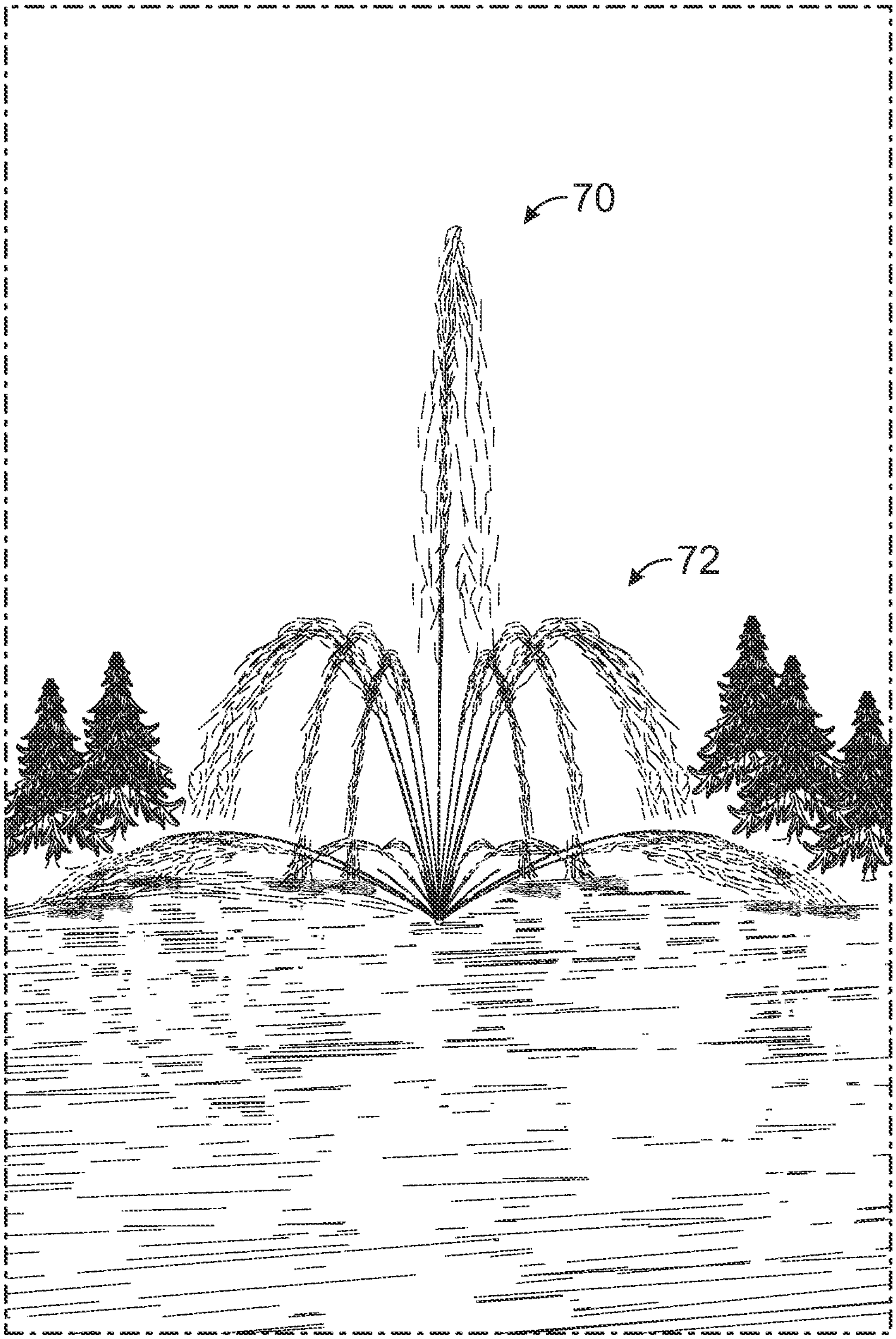
FIG. 8 is a visual water display, fountain, spray pattern, and/or design ("display") resulting from Applicant's submersible pump apparatus and, in particular, illustrating a non-limiting example of a very tall center stream in combination with a second alternate spider and arch design.

In use, and when engaged, water flows into and through the impeller pump assembly or high-pressure pump 22, then passes into the central hub assembly 25 as it enters and passes through the pipe 40, after which, the water flow then passes into and engages the elbow 44 which redirects the water flow into the pipe 41. As this occurs, the elbow 44 creates turbulence in the water flow. With the lower section of the central high-pressure pipe 41 fitted with a flow straightening device 46, this turbulence is removed from the water flow and the water continues up and through the pipe 41 and into the nozzle assembly 26 where the water is discharged from the center nozzle 50 into a smooth and coherent stream. This results in a very tall streams 70, as illustrated in FIGS. 6-8.

At the same time, water flows into and through the aerator pump assembly or high- volume pump 24, then passes into the central hub assembly 25 as it enters and passes into and fills the opening 64 within the central hub assembly 25 (e.g., which comprises all of the open space within the central hub assembly 25 surrounding the pipe 40, elbow 44, and high-pressure pipe 41). The water is forced upward and through the by-pass channel 74, after which, the water flow then passes into the flare outlet 55 and engages the cone deflector 54 which redirects the water flow, per the angle 68 of the cone deflector 54, where the water is discharged. Alternatively, the water flow may be through the multitude of nozzles 58, as illustrated in FIG. 4. In this manner, depending upon the flare outlet and cone deflector 54 or alternate multitude of nozzles 58, this results in a wide variety of beautiful high flow display spray patterns 72, as illustrated in FIGS. 6-8.

Collectively, the very tall streams 70 and the variety of high flow display spray patterns 72, in combination, create the visual water display, fountain, spray pattern, and/or design ("display") resulting from Applicant's submersible pump apparatus.

Thus, Applicant's invention can efficiently create a very high stream (Sky Geyser) while at the same time likewise create a multiple stream display aerator pattern(s) and/or a large fan pattern(s).

This unique design passes the high-pressure center stream through the center of the display aerator nozzle fed by the impeller pump assembly 22 to create a very high center stream, and the outer portion of the nozzle which is fed by the aerator pump assembly 24 creates one of many possible beautiful display aerator patterns.

And, the central stream is created by a real high precision stainless steel nozzle 50 so that a very coherent and high stream is created.

In a non-limiting example, the submersible pump apparatus 20 may provide a 5 HP high-pressure pump 22 (fountain pump) and a 5 HP high-volume (display aerator pump); or alternatively in any of the other following combinations: 3+3 HP, 5+3 HP, and 3+5 HP, respectively.

Thus, with a 5 HP fountain pump a Sky Geyser pattern can be created that is 50' high which is as high as most 20 HP Titans, but requires much less power, while the 5 HP high volume aerator pump is pumping large quantities of water in high flow, thick stream, display aerator pattern(s).

Moreover, a more technical discussion of the workings and advantages of Applicant's new and inventive device.

It is impossible to create a spray pattern that is both very high and which can also create multiple lower and high flow streams with just one submersible pump because a pump that can generate enough pressure or head to make a high pattern, such as 50 feet, has too much head and not enough flow to create multiple lower high steams that can create a pleasing and trouble free pattern, and a high volume pump capable of creating heavy flow streams can only achieve modestly high streams of about 20 feet.

Thus, the problem in creating a high stream and heavy flow for a lower pattern is four-fold:

A. How to arrange two different pumps so they efficiently and economically can feed one nozzle;

B. How to minimize the water depth requirement of the system; C. How to create a nozzle that allows the center portion to create a high stream while allowing the outer portion to create a low but heavy stream evenly surrounding the center stream; and D. How to route the different pressure and volume streams to be directed to their respective portion of the nozzle.

With regard to problem A, arranging the pumps longitudinally with the outputs facing each other allows all of the pumped water to be directed to one area. In this manner, it is directed into the opposite ends of the submersible pump apparatus.

With regard to problem B, arranging the pumps horizontally and arranging for attaching flotation very close to the pump housing and intake screen allows the assembly to operate in very shallow water (e.g., as little as 2 feet or 24 inches of water).

With regard to problem C, the nozzle base is large enough that the threaded on each end pipe supplying the high-pressure water to the center of the nozzle can slip closely through a central hole prepared in the nozzle and allow a nozzle adapter or a nozzle to be threaded onto the adapter or the pipe.

With regard to Problem D, operation of both pumps will always produce a very tall center stream, except when the high-pressure pump is controlled by a VFD. The high flow pump will produce heavy flow and lower display aerator patterns. Alternatively, as desired, either pump can be operated alone to produce just part of the patterns. This would be particularly advantageous in windy conditions to eliminate distortion and wind drifted spray by shutting down the high-pressure pump that creates the very high pattern (e.g., such as a Sky Geyser) and continuing to operate the display aerator portion of the pattern.

The famous, brilliant, and economical Aqua Control, Inc.'30 and 80 watt light emitting diode (LED) lights 78, as illustrated in FIG. 5, can be easily attached, including spot lights for the very high center stream, and the 80 watt lights are available in a programmable version. These lighting options create a brilliantly lit pattern even for the very high center stream.

Thus, there has been provided Applicant's new and improved submersible pump apparatus. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. A device for use with a fluid, comprising:

a central hub having a hollow body and providing a first leg having a first opening and a second leg having a second opening, with the first opening and the second opening situated in a horizontal alignment and directly opposed to one another and defining a horizontal central axis through the hollow body between the first leg and the second leg; the central hub further providing a third hollow leg having an outlet, wherein the third hollow leg extends outwardly at a perpendicular angle to the horizontal central axis, the central hub forming a t-shape;

a hollow pipe located within the central hub and extending through the hollow body of the central hub from the first opening to the outlet;

a nozzle coupled to the hollow pipe at a top of the outlet of the third hollow leg;

a flare outlet formed from an opening created between a combination of a cone deflector extending outwardly from the hollow pipe and an exterior vertical wall portion of the nozzle tapering inwardly toward the cone deflector;

a first pump assembly having a first pump housing containing a motor, a first pump, and an outlet flange, with the outlet flange situated inside the first opening; the first pump housing removably attached to the first leg at the first opening of the hollow body and the outlet flange interconnecting the first pump to the hollow pipe inside the first leg of the hollow body and with the first pump assembly in fluid communication with the hollow pipe;

a second pump assembly having a second pump housing containing a motor and a second pump the second pump housing inserted inside the second opening of the second leg, the second pump assembly in fluid communication with the third hollow leg, the second pump being a different pump than the first pump;

the first pump and the second pump situated at opposite ends of the horizontal central axis with a first fluid flow exiting from a first pump end within the first opening flowing along the horizontal central axis in a direction toward the second pump while simultaneously a second fluid flow is exiting from a second pump end within the second opening flowing in an opposite direction along the horizontal central axis toward the first pump, with the first fluid flow and the second fluid flow being directly opposed to one another;

wherein, during operation, when the first pump is engaged, the fluid flows directly into the first opening of the hollow body and through the hollow pipe from the first opening to the outlet of the third hollow leg, and into and out of the nozzle to create a first visual fluid display; and wherein, during operation, when the second pump is engaged at a same time as the first pump is engaged, the fluid flows directly into the second opening and through an entirety of the hollow body of the central hub surrounding the hollow pipe, passing the exterior vertical wall portion of the nozzle tapering inwardly toward the cone deflector that directs the fluid toward the cone deflector and out the flare outlet to create a second visual fluid display.

2. The device of claim 1, wherein the first visual fluid display is streams of water that extend to a height in an air that is higher than a height in the air of the second visual fluid display.

3. The device of claim 2, wherein the second visual fluid display is a plurality of display spray patterns.

4. The device of claim 3, wherein the first visual fluid display and the second visual fluid display are simultaneously created and displayed at a same time.

5. The device of claim 4, wherein the first pump is an impeller pump.

6. The device of claim 5, wherein the second pump is an aerator pump.

7. The device of claim 1, wherein a first float is attached to the first pump.

8. The device of claim 7, wherein a second float is attached to the second pump.

9. The device of claim 8, wherein the first float and the second float coact to permit the device to operate in twenty-four inches of water.

10. The device of claim 1, wherein a flow straightener is provided within the hollow pipe between the first opening and the outlet of the central hub.

11. The device of claim 1, wherein an elbow is provided in the hollow pipe to redirect the hollow pipe extending from the first opening up toward the outlet of the central hub.

12. The device of claim 11, wherein a plurality of supports situated between the hollow pipe and the central hub fixedly secure the elbow and the hollow pipe within the hollow body of the central hub.

13. A device for use with a fluid, comprising:

a hollow body providing a first opening and a second opening, with the first opening and the second opening directly opposed to one another; the hollow body further providing a second hollow body having an outlet, wherein the second hollow body extends outwardly at a perpendicular angle to the first opening and the second opening, the hollow body and the second hollow body forming a t-shape and defining a hollow central hub;

a hollow pipe located within the hollow central hub and extending through the hollow central hub from the first opening to the outlet;

a central nozzle coupled to the hollow pipe and extending outwardly from the hollow central hub at a central angle in alignment with the outlet of the hollow central hub;

a plurality of nozzles coupled to the outlet of the hollow central hub and each nozzle of the plurality of nozzles extending outwardly from the hollow central hub at a different angle than the central angle;

a first pump assembly having a first pump housing containing a motor, a first pump, and an outlet flange, with the outlet flange situated inside the first opening; the first pump housing removably attached to the first opening of the hollow body and the outlet flange interconnecting the first pump to the hollow pipe inside the first opening of the hollow body and with the first pump assembly in fluid communication with the hollow pipe;

a second pump assembly having a second pump housing containing a motor and a second pump, the second pump housing inserted inside the second opening of the hollow body the first pump being an impeller pump and the second pump being an aerator pump;

wherein, during operation, when the first pump is engaged, the fluid flows directly into the first opening of the hollow central hub and through the hollow pipe from the first opening of the hollow central hub to the outlet of the hollow central hub, and into and out of the central nozzle at the central angle to create a first visual fluid display; and wherein, during operation, when the second pump is engaged at a same time as the first pump is engaged, the fluid flows directly into the second opening of the hollow central hub and through an entirety of the hollow central hub surrounding the hollow pipe, and into and out the plurality of nozzles at the different angle to the central angle to create a second visual fluid display.

* * * * *